United States Patent Office 3,294,710
Patented Dec. 27, 1966

3,294,710
FLAMEPROOF POLYURETHANE RESINS
Richard H. Rosenberg and Robert S. Cooper, Park Forest, Ill., assignors to Stauffer Chemical Company, New York, N.Y., a corporation of Delaware
No Drawing. Filed July 30, 1962, Ser. No. 213,142
9 Claims. (Cl. 260—2.5)

This invention relates to flame resistant polyurethane foams.

In particular this invention relates to polyurethane foams which have been made flame resistant by the addition and reaction therewith of a mixture comprising one or more phosphorus containing compounds and a chlorinated hydrocarbon composition. When produced according to the methods of this invention the resulting flame-proofed compositions may be used in the form of expanded foamed products as thermal insulation. By using the well-known technique of foaming in place such insulation has found wide use in the manufacture of refrigerators and aircraft components wherein such foams add strength as well as flame resistance to the components.

The production of urethane or isocyanate polymers is a well-known commercial process, see for instance Kirk-Othmer, "The Encyclopedia of Chemical Technology," first supplement, pages 888, et seq. (Interscience, 1957). Briefly, this process involves the reaction of an isocyanate and a second compound which may contain an hydroxyl, amino or carboxy group, i.e., a compound containing active hydrogen. As used in this specification, the term "isocyanate material" is intended to include isocyanate or urethane compositions containing unreacted —NCO radicals.

The most common polymers are formed by the reaction of toluene diisocyanate (hereafter TDI) and a saturated polyether or polyester. (This latter compound may, however, contain benzene unsaturation.) Other representative isocyanates include polymethylene polyphenyl isocyanate and p,p-diphenylmethylene diisocyanate. Representative polyesters are the reaction products of adipic acid and/or phthalic anhydride and ethylene glycol. Other compounds which may be used in place of the polyesters or polyethers are simple glycols, polyglycols, castor oil, drying oils, etc. Whether the products are to be flexible or rigid depends upon the degree of cross-linking and thus the type of polyol which is used. Since the products of this invention may replace only a part of the polyol, they are thus suitable for use in either flexible or rigid foams.

When an expanded or foamed flexible product is to be produced, it is the general practice to add water to the composition. The water reacts with the —NCO groups to release $CO_2$ and cause the expansion of the polymer into a foamed mass.

Control of this reaction requires considerable skill and often special equipment. When producing rigid foams for thermal insulation, it has been found advisable to use inert dissolved gases including the various halohydrocarbons such as the well-known Freons or Genetrons. These low boiling liquids boil when warmed by the heat of reaction and thus cause foaming. They also serve to lower the thermal conductivity and increase the flame resistance of the resulting foam. The term "foaming agent" as used herein is intended to include both reactive materials such as water and inert materials such as halohydrocarbons, or mixtures of the two, which cause the copolymers to form an expanded foam.

In addition to the actual reactants and foaming agents, it is also desirable in many cases to add a small amount of a surfactant in order to provide a uniform, fine cell structure.

According to the process of this invention, the above-described urethane polymers may be flameproofed by adding a combination of at least two flameproofing agents. This combination produces results in the final polyurethane foam which are far better than would be expected from an examination of the results which are obtained by the use of either of the flameproofing components alone. Briefly speaking, this invention covers the use of a phosphorus containing flameproofing component and a chlorinated hydrocarbon flameproofing component.

The phosphorus containing compounds in turn fall into two separate classes. The first class of compounds may be represented by the general formula:

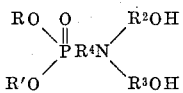

wherein R and $R^1$ may be the same or different alkyl or haloalkyl radicals and $R^2$ and $R^3$ may be the same or different lower alkylene radicals and $R^4$ is a lower alkylene radical.

These compounds may be made according to the following general reaction:

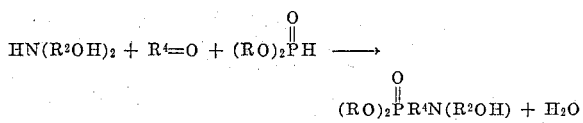

Briefly, this reaction may be said to involve the reaction of a dialkanolamine, an aldehyde or ketone, and a dialkyl phosphite. Suitable dialkanolamines for the purpose of this invention include such compounds as diethanolamine, dipropanolamine, ethanol propanolamine, dibutanolamine, dioctonalamine, etc.

Suitable aldehydes or ketones are such well-known compounds as formaldehyde, acetaldehyde, butyraldehyde, furfural, acetone, methyl ethyl ketone, etc.

Dialkyl phosphites which are suitable are dimethyl phosphite, diethyl phosphite, methyl ethyl phosphite, dipropyl phosphite, dibutyl phosphite, dioctyl phosphite, beta chloroethyl phosphite, etc.

As an example of the preparation of compounds of this type, the following example may be shown.

*Example 1.—Preparation of diethyl N,N-diethanolaminomethylphosphonate*

To 30.9 grams of diethanolamine was added 24.4 grams of aqueous 37% formaldehyde while stirring at 20–30° C. in a reaction flask equipped with thermometer, and dropping funnel. Diethyl phosphite, 41.4 grams, was then added dropwise while stirring and holding the temperature at 21–35° C. Both of the above reactions were exothermic. The reaction mixture was held at 35° C. with cooling until the exothermic reaction was complete in about 40 minutes and was then cooled below 30° C. The mixture was further stirred at room temperature and then heated to 50° C. for 15 minutes. After cooling it was extracted with 100 ml. of ether and the resulting aqueous phase was then concentrated by distillation under reduced pressure. The residue at 50° C. under 1 mm. pressure was collected as the diethyl N,N-diethanolaminomethylphosphonate product. It had an index of refraction $N_D^{25}=1.4648$, weighed 72.5 grams (94.8% yield) and analyzed as 12.3% P, 4.9% N (theory 12.2 and 5.5, respectively).

Compounds of the type described above are fully described and claimed in U.S. Patent 3,076,010, which issued January 29, 1963.

The second class of phosphorus compounds which we have found suitable for the present invention may be represented by the following formula:

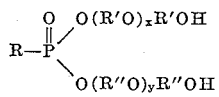

where R may be selected from the group consisting of alkyl, aryl, alkoxy, aryloxy, chloroalkyl, hydroxyalkyl, and alkanolaminoalkyl; R' and R" are lower alkylene radicals and $x$ and $y$ may vary from 1 to 4. These compounds are well-known in the art and may be made be reacting an acidic phosphorus containing compound with an alkylene oxide according to the following equation:

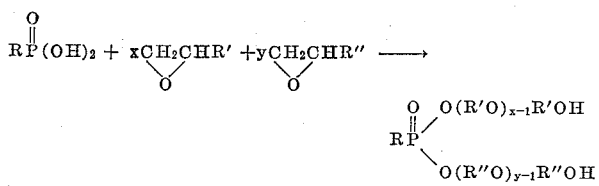

wherein R, R', and $x$ are as defined above. It is understood, of course, that the $x$ moles of alkylene oxide do not necessarily react symmetrically with the acidic hydrogens of the phosphorus acid.

Briefly, the reaction may be described as involving the reaction of a phosphonic or phosphoric acid with an alkylene oxide. Suitable phosphoric acids are mono alkyl phosphoric acids such as methyl phosphoric acid, ethyl phosphoric acid, butyl phosphoric acid, lauryl phosphoric acid, etc. Suitable mono aryl phosphoric acids are phenyl phosphoric acid, cresyl phosphoric acid, xylyl phosphoric acid, etc. Phosphonic acids which may be used are alkyl phosphonic acids such as methylphosphonic acid, ethylphosphonic acid and butylphosphonic acid; chloroalkylphosphonic acids such as chloromethylphosphonic acid and trichloromethylphosphonic acid; arylphosphonic acids such as phenylphosphonic acid and cresylphosphonic acid; hydroxyalkylphosphonic acids such as hydroxymethylphosphonic acid; and alkanolaminoalkylphosphonic acids such as diethanol aminomethylphosphonic acid.

Suitable alkylene oxides which may be used are ethylene oxide, propylene oxides, butylene oxide and the like.

An example of the preparation of the above described compounds may be illustrated as follows:

*Example 2.—Preparation of polyoxyethylene phenylphosphonate*

Ethylene oxide was added to 500 grams of phenylphosphonic acid until no further reaction ensued. The temperature was held at below 70° C. during the addition. The reaction mixture was stabilized to 50° C. under 2 mm. Hg pressure. The product weighed 1122.0 grams and had an index of refraction $N_D^{25}=1.5082$.

This indicates that 4.5 moles of ethylene oxide reacted per mole of phenylphosphonic acid.

These types of compounds are more fully described and claimed in copending application, Serial No. 35,443, filed June 13, 1960.

The chlorinated hydrocarbons which are used in the practice of the present invention, consist of two basic types of materials, namely, the chlorinated paraffins and the chlorinated polyphenyls. Preferably, for the purposes of this invention, these compounds should contain at least 60% chlorine and be solid compounds with melting points above approximately 100° C. Compounds meeting these general specifications will remain in the final urethane composition without migration or bleeding such as may occur when the less chlorinated liquid products are used.

The chlorinated paraffins are chlorinated derivatives of naturally occurring higher paraffins. They are well-known commercial products and when they contain at least 60% chlorine, as is preferred for the present invention, they are solid products. They are prepared by passing chlorine through molten paraffin wax, in some instances, using a hydrocarbon solvent in order to obtain the high chlorine content. A large number of suitable commercial products are available, see for instance the "Encyclopedia of Chemical Technology," Kirk-Othmer, Interscience, 1949, vol. 3, pages 781, et seq. Table I, in particular, shows a list of products of the type suitable for the present invention.

The chlorinated polyphenyls suitable for this invention are chemically inert materials prepared by the chlorination of diphenyl, terphenyl, or the more complex polyphenyls. The pure compounds are usually crystalline solids but the commercial products are more generally mixtures of the various compounds and, in some cases, may be viscous liquids. Usually when at least 60% chlorine is present, as is preferred for the present invention, the products are at least partly of a crystalline nature. A number of commercially available products are satisfactory for the purpose of this invention and such compounds and their method of manufacture are clearly described in Kirk-Othmer, supra, at pages 826, et seq. Table I, in particular shows the physical properties of such compounds.

The following examples illustrate the improved result obtained when various combinations of flameproofing agents are used according to the methods of the present invention. In conducting these tests, a series of tests were first run in which phosphorus compounds alone were used in the concentration necessary to prepare self-extinguishing foams as determined by the procedure described in ASTM D1692-59T. After this level of flameproofing agent had been established, the second series of foams were prepared in which combinations of the phosphorus-containing compounds and the chlorinated hydrocarbons were used which would give flammability test results which were either comparable or superior to the foams which had contained only the phosphorus-containing flameproofing agent.

A third series of tests were then run in which the phosphorus compounds and the chlorinated hydrocarbons were used singly at the same level which had been necessary when using the two in combination.

In preparing the foams illustrated in the following examples, the following procedure was used. The ingredients of component A were first weighed into a 350 ml. stainless steel beaker, blended by hand, and then stirred with a 1750 r.p.m. mechanical stirrer having two three-bladed propellers 2 inches in diameter. The ingredients of component B were similarly weighed and mixed in a 16-ounce plastic impregnated paper cup. Component A was poured into component B and the blend stirred with the same mixer for 15 seconds. The mixture was then poured to a room temperature, paper lined mold where it reacted releasing heat, foamed, and polymerized to a low density cellular thermo-setting plastic having essentially closed cells filled with the foaming agent vapors. When chlorinated hydrocarbons were used in these examples, they were dissolved in the B component prior to final mixing.

In order to test the flammability of the resulting urethane foams, the test used was that which is designated as ASTM D1692-59T. This procedure is outlined as follows:

Specimens were cut from various parts of the foam block. They were trimmed on a bandsaw to ½" x 6" x 2" dimensions. Marks were made on top of the specimens 1" from the 2" wide ends. The specimens were rested on a piece of ¼" hardware cloth (galvanized steel woven wire screen having mesh openings approximately ¼" squares) which measured 3" x 8". One 3" end of the screen was bent up 90° for ½". The 2" end of the foam sample was placed against this turned-up end. The screen and sample were placed in a draft-free chamber. A Bunsen burner with a wing tip which had a 1½" high flame was placed ½″ below the turned-up screen end. When the flame front reached the first one inch mark on the top of the foam specimen, the gas burner was turned off and a stopwatch was started. The watch was stopped when the flame went out or reached the second mark on the top of the specimen. The time interval and the length of the foam charred or burned (measured on the top of the specimen from the first one inch mark) were recorded. A minimum of ten tests was run on each foam. The test specifications established the criteria for rating the foams as non-burning (never reaching the first one inch mark), self-extinguishing (went out before reaching the second mark), or burning.

The following examples illustrate our invention.

SERIES I.—PHOSPHORUS-CONTAINING RIGID FOAMS

*Example 3.—Foam containing 25%\* Fyrol 12 [1]*

Component A:                                    Gm.
   Selectron 6402 [2] (H.N.=473) [7] _____ 61.2
   Fyrol 12 [1] (H.N.=274) _____ 66.4
   Silicone L-521 [3] _____ 1.5
   Catalyst [4] _____ 0.6
   Foaming agent [5] _____ 46.8
Component B:
   Selectron 643 [6] (30.1% NCO) _____ 135.0
Density 1.83 lbs./ft.[3].
This foam contained 2.13% P.

\* Percentages are based on total ingredients except the foaming agent in this and all the following formulations.
[1] Polyoxypropylene chloromethylphosphonate MW= approximately 363.
[2] Sucrose base polyether polyol obtained by condensing sucrose with propylene oxide.
[3] Surface active agent.
[4] Triethylene diamine.
[5] Trichloromonofluoromethane.
[6] Semi-prepolymer of Selectron 6402 and excess TDI.
[7] H.N.=Hydroxyl number.

FLAME TEST ASTM D1692—59T RESULTS

| | Burning Time, Sec. | Inches Consumed |
|---|---|---|
| Original | 20.2 | ⅜ |
| After 1 week at— | | |
| 100° F./100% R.H. | 11.2 | ⁵⁄₁₆ |
| 158° F./60% R.H. | 18.3 | 1¹⁄₁₆ |
| 176° F./5% R.H. | 23.6 | 1¹⁄₁₆ |
| After 6 mos. at 75° F./100% R.H. | 13.5 | ⅜ |

*Example 4.—Foam containing 16.8 Fyrol 6 [1]*

Component A:                                    Gm.
   Selectron 6402 (H.N.=473) _____ 75.0
   Fyrol 6 [1] (H.N.=442) _____ 50.75
   Catalyst _____ 0.75
   Foaming agent _____ 38.0
Component B:
   Selectron 6403 (30.1% NCO) _____ 125.0
   Silicone L-521 _____ 1.35
Density 1.97 lbs./ft.[3].
This foam contained 2.16% P.

[1] Compound of Example 1.

FLAMMABILITY TEST RESULTS

| | Burning Time, Sec. | Inches Consumed |
|---|---|---|
| Original | 13.4 | ½ |
| After 1 week at— | | |
| 100° F./100% R.H. | 8.3 | ⅛ |
| 158° F./60% R.H. | 14.2 | ½ |
| 176° F./5% R.H. | 15.6 | ⅜ |

*Example 5.—Foam containing 20% Fyrol 6*

Component A:                                    Gm.
   Fyrol 6 (H.N.=442) _____ 49.7
   Selectron 6402 (H.N.=469) _____ 61.5
   Catalyst _____ 0.8
   Silicone L-521 _____ 1.5
   Foaming agent _____ 45.1

Component B:
   Selectron 6403 (29.8% NCO) _____ 141.3
Density 1.69 lbs./ft.[3].
This foam contained 2.06% P.

FLAMMABILITY TEST RESULTS

| | Burning Time, Sec. | Inches Consumed |
|---|---|---|
| Original | 6.9 | ⅜ |
| After 1 week at— | | |
| 100° F./100% R.H. | 4.9 | ⅛ |
| 158° F./60% R.H. | 8.6 | ⅜ |
| 176° F./5% R.H. | 12.6 | ⁷⁄₁₆ |
| After 6 mos. at 75° F./100% R.H. | 7.3 | ³⁄₁₆ |

*Example 6.—Foam containing 25% Fyrol 13 [1]*

Component A:                                    Gm.
   Fyrol 13 [1] (H.N.=300) _____ 61.7
   Voranol RN-600 [2] (H.N.=600) _____ 47.6
   Tetramethylguanidine _____ 0.4
   Dibutyl tin dilaurate _____ 0.2
   Silicone DC-113 [3] _____ 2.0
   Foaming agent _____ 44.1
Component B:
   Voranate R-1 [4] (27.4% NCO) _____ 135.0
Density 2.20 lbs./ft.[3].
This foam contained 1.93% P.

[1] Monochloromethylphosphonic acid adduct of propylene oxide.
[2] Polyether polyol obtained by condensing sucrose with propylene oxide.
[3] Surfactant.
[4] Prepolymer with excess TDI.

FLAMMABILITY TEST RESULTS

| | Burning Time, Sec. | Inches Consumed |
|---|---|---|
| Original | 11.2 | ⅛ |
| After 1 week at 100° F./100% R.H. | 11.2 | ³⁄₁₆ |

SERIES II.—FOAMS CONTAINING BOTH PHOSPHORUS COMPOUNDS AND CHLORINATED HYDROCARBONS

*Example 7.—Foam containing 20% Fyrol 12 and 10% Chlorowax 70 [1]*

Component A:                                    Gm.
   Fyrol 12 (H.N.=274) _____ 57.5
   Selectron 6402 (H.N.=469) _____ 64.8
   Catalyst _____ 0.9
   Silicone L-521 _____ 1.8
   Foaming agent _____ 20.0
Component B:
   Selectron 6403 (29.8% NCO) _____ 135.0
   Chlorowax 70 [1] _____ 28.9
   Foaming agent _____ 30.9
Density 1.93 lbs./ft.[3].
This foam contained 1.69% P and 6.36% Cl.

[1] Chlorinated paraffin, 70% chlorine.

FLAMMABILITY TEST RESULTS

| | Burning Time, Sec. | Inches Consumed |
|---|---|---|
| Original | 6.8 | ³⁄₁₆ |
| After 1 week at— | | |
| 100° F./100% R.H. | 0 | 0 |
| 158° F./60% R.H. | 12.4 | ⁷⁄₁₆ |
| 176° F./5% R.H. | 6.9 | ½ |
| After 6 mos. at 75° F./100% R.H. | 2.3 | ¹⁄₁₆ |

*Example 8.—Foam containing 10% Fyrol 6 and 10% Chlorowax 70 LP [1]*

Component A:                                    Gm.
   Fyrol 6 (H.N.=442) _____ 27.9
   Selectron 6402 (H.N.=473) _____ 86.3
   Catalyst _____ 0.8
   Silicone L-521 _____ 1.6
   Foaming agent _____ 49.3

Component B:
 Selectron 6403 (29.0% NCO) _____ 135.0
 Chlorowax 70 LP¹ _____ 27.9
Density 1.92 lbs./ft.³.
This foam contained 1.05% P and 5.94% Cl.

¹ Chlorinated paraffin, 70% chlorine.

FLAMMABILITY TEST RESULTS

|  | Burning Time, Sec. | Inches Consumed |
|---|---|---|
| Original | 3.4 | 1/8 |
| After 1 week at 100° F./100% RH | 4.6 | 1/32 |

*Example 9.—Foam containing 13% Fyrol 6 and 10% Aroclor 1268¹*

Component A:                               Gm.
 Fyrol 6 (H.N.=442) _____ 36.1
 Selectron 6402 (H.N.=473) _____ 76.0
 Silicone L-521 _____ 1.5
 Catalyst _____ 0.8
 Foaming agent _____ 48.9
Component B:
 Selectron 6403 (29.8% NCO) _____ 135.0
 Aroclor 1268¹ _____ 27.7
Density 2.12 lbs./ft.³.
This foam contained 1.38% P and 5.65% Cl.

¹ Chlorinated polyphenyl.

FLAMMABILITY TEST RESULTS

|  | Burning Time, Sec. | Inches Consumed |
|---|---|---|
| Original | 9.9 | 5/16 |
| After 1 week at 100° F./100% RH | 16.9 | 9/16 |

*Example 10.—Foam containing 12% Fyrol 12 and 10% Chlorowax 70 LP*

Component A:                               Gm.
 Fyrol 12 (H.N.=274) _____ 33.5
 Selectron 6402 (H.N.=468) _____ 80.9
 Catalyst _____ 0.8
 Silicone L-521 _____ 1.6
 Foaming agent _____ 49.4
Component B:
 Selectron 6403 (29.0% NCO) _____ 135.0
 Chlorowax 70 LP _____ 28.0
Density 1.87 lbs./ft.³.
This foam contained 1.02% P and 5.96% Cl.

FLAMMABILITY TEST RESULTS

|  | Burning Time, Sec. | Inches Consumed |
|---|---|---|
| Original | 9.4 | 1/4 |
| After 1 week at 100° F./100% RH | 7.9 | 3/16 |

*Example 11.—Foam containing 10% Fyrol 12 and 15% Chlorowax 70*

Component A:                               Gm.
 Fyrol 12 (H.N.=274) _____ 29.8
 Selectron 6402 (H.N.=468) _____ 76.6
 Catalyst _____ 0.6
 Silicone L-521 _____ 1.0
 Foaming agent _____ 52.6
Component B:
 Selectron 6403 (29.8% NCO) _____ 135.0
 Chlorowax 70 _____ 44.7
Density 2.06 lbs./ft.³.
This foam contained 0.88% P and 9.18% Cl.

FLAMMABILITY TEST RESULTS

|  | Burning Time, Sec. | Inches Consumed |
|---|---|---|
| Original | 7.6 | 1/8 |
| After 1 week at 100° F./100% RH | 7.5 | 1/8 |

*Example 12.—Foam containing 20% Fyrol 13 and 10% Chlorowax 70 LP*

Component A:                               Gm.
 Fyrol 13 (H.N.=300) _____ 58.7
 Voranol RN-600 (H.N.=600) _____ 67.2
 Dibutyl tin dilaurate _____ 0.12
 Catalyst _____ 0.3
 Silicone DC-113 _____ 2.0
 Foaming agent _____ 51.7
 Chlorowax 70 LP _____ 29.2
Component B:
 Voranate R-2 (33.8% NCO) _____ 135.0
Density 2.02 lbs./ft.³.
This foam contained 1.53% P and 5.99% Cl.

FLAMMABILITY TEST RESULTS

|  | Burning Time, Sec. | Inches Consumed |
|---|---|---|
| Original | 3.4 | 1/16 |
| After 1 week at 100° F./100% RH | 6.1 | 3/16 |

SERIES III.—Foams Containing Phosphorus Compounds or Chlorinated Hydrocarbons Alone

*Example 13.—Foam containing 20% Fyrol 12*

Component A:                               Gm.
 Fyrol 12 (H.N.=383) _____ 55.2
 Selectron 6402 (H.N.=473) _____ 82.8
 Tetramethylguanidine _____ 0.97
Component B:
 Foaming agent _____ 66.45
 Silicone L-521 _____ 1.8
 Selectron 6403 (30.1% NCO) _____ 135.0
Density 1.50 lbs./ft.³.
This foam contained 1.45% P.

FLAMMABILITY TEST RESULTS

|  | Burning Time, Sec. | Inches Consumed |
|---|---|---|
| Original | 31.3 | 2 1/16 |
| After 1 week at— |  |  |
| 100° F./100% RH | 19.9 | 1 1/16 |
| 176° F./5% RH | 39.5 | 1 7/8 |

*Example 14.—Foam containing 10% Fyrol 6*

Component A:                               Gm.
 Fyrol 6 (H.N.=274) _____ 24.9
 Selectron 6402 (H.N.=469) _____ 86.6
 Silicone L-521 _____ 1.35
 Catalyst _____ 0.8
 Foaming agent _____ 43.9
Component B:
 Selectron 6403 (28.9% NCO) _____ 135.0
Density 1.84 lbs./ft.³.
This foam contained 1.06% P.

FLAMMABILITY TEST RESULTS

|  | Burning Time, Sec. | Inches Consumed |
|---|---|---|
| Original | (¹) |  |
| After 1 week at 100° F./100% RH | 47.1 | 1 3/4 |

¹ Not self-extinguishing.

*Example 15.*—Foam containing 20% Chlorowax 70 LP

Component A: | Gm.
--- | ---
Selectron 6402 (H.N.=469) | 37.7
Silicone L-521 | 0.5
Catalyst | 0.2
Foaming agent | 18.4

Component B:
Selectron 6403 (29.8% NCO) | 45.0
Chlorowax 70 LP | 20.8

Density 2.01 lbs./ft.³
This foam contained 11.88% Cl.

FLAMMABILITY TEST RESULTS

Not self-extinguishing.

The advantages of the present invention can be clearly seen from an examination of the above examples. Thus, when using the phosphorus-containing compounds by themselves, it is necessary to incorporate from about 1.75% to about 2.5% of phosphorus in order to make a polyurethane foam self-extinguishing. When using only the chlorinated hydrocarbons, foams containing 20–30% of the chlorinated hydrocarbons alone are not self-extinguishing and in many cases are too friable for practical use.

On the other hand, when proceeding according to the present invention, it is possible by using an addition of 7–15% of the chlorinated hydrocarbons (5–10% Cl), to reduce the amount of phosphorus compound necessary to make a self-extinguishing foam to a value low enough to give 0.75 to 1.75% of phosphorus in the final foam. This not only gives an improved final product, but is also an economic advantage since the chlorinated hydrocarbons are in general less expensive than the phosphorus compounds. We have further found that by reducing the amount of the phosphorus compounds in these formulations, in many cases the physical strength and dimensional stability of the foam are increased. Furthermore, the use of the chlorinated hydrocarbons which are generally solids with melting points above 100° C., prevents migration or bleeding as may often occur when liquid plasticizer-type self-extinguishing agents are used. Thus it can be seen that numerous advantages result when using the combination of flame-proofing agents which forms the basis of the present invention.

The foregoing description is given for clearness of understanding only and no unnecessary limitations should be derived therefrom.

We claim:
1. A flame resistant urethane composition comprising:
    (a) a phosphorus compound selected from the class consisting of
        (1) a dialkanolaminoalkylphosphonate having the formula:

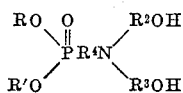

wherein R and R' are selected from the group consisting of lower alkyl and lower haloalkyl radicals, and R², R³, and R⁴ are lower alkylene radicals; and
        (2) a phosphorus compound of the formula:

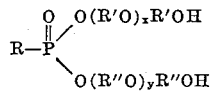

wherein R is a member of the class consisting of alkyl, aryl, alkoxy, aryloxy, chloroalkyl, hydroxy alkyl and alkanolaminoalkyl; R' and R'' are lower alkylene radicals; and $x$ and $y$ may vary from about 1 to about 4;
in an amount sufficient to provide about 0.75% to about 1.75% phosphorus in the final composition;
    (b) a chlorinated hydrocarbon selected from the class consisting of chlorinated paraffins and chlorinated polyphenyls in an amount sufficient to provide about 5% to about 10% chlorine in the final composition,
    (c) a polyisocyanate reacted with a resinous organic compound having a reactive hydrogen and selected from the group consisting of a polyester, a polyether, and castor oil, and
    (d) a foaming agent.
2. A flame resistant urethane composition according to claim 1 wherein the phosphorus compound is diethyl N,N-diethanolaminomethylphosphonate.
3. A flame resistant urethane composition according to claim 1 wherein the phosphorus compound is polyoxypropylene phenylphosphonate.
4. A flame resistant urethane composition according to claim 1 wherein the phosphorus compound is polyoxypropylene monochloromethylphosphonate.
5. A flame resistant urethane composition according to claim 1 wherein the chlorinated hydrocarbon is a chlorinated paraffin containing at least 60% chlorine.
6. A flame resistant urethane composition according to claim 1 wherein the chlorinated hydrocarbon is a chlorinated polyphenyl containing at least 60% chlorine.
7. A flame resistant urethane foam composition as in claim 1, wherein the foaming agent is water.
8. A flame resistant urethane foam composition as in claim 1 wherein the foaming agent is trichloromonofluoromethane.
9. A flame resistant urethane foam composition as in claim 1 wherein the foaming agent is a mixture of water and trichloromonofluoromethane.

References Cited by the Examiner

UNITED STATES PATENTS 2,551,562 | 5/1951 | Jenkins | 260—33.8
--- | --- | --- | ---
3,067,149 | 12/1962 | Dombrow | 260—2.5
3,076,010 | 1/1963 | Beck et al. | 260—2.5

FOREIGN PATENTS 205,456 | 1/1957 | Australia.
--- | --- | ---
1,106,489 | 5/1961 | Germany.

LEON J. BERCOVITZ, *Primary Examiner.*

D. E. CZAJA, *Assistant Examiner.*